No. 645,211. Patented Mar. 13, 1900.
G. B. PETSCHE.
ADJUSTING DEVICE.
(Application filed July 31, 1897.)
(No Model.)
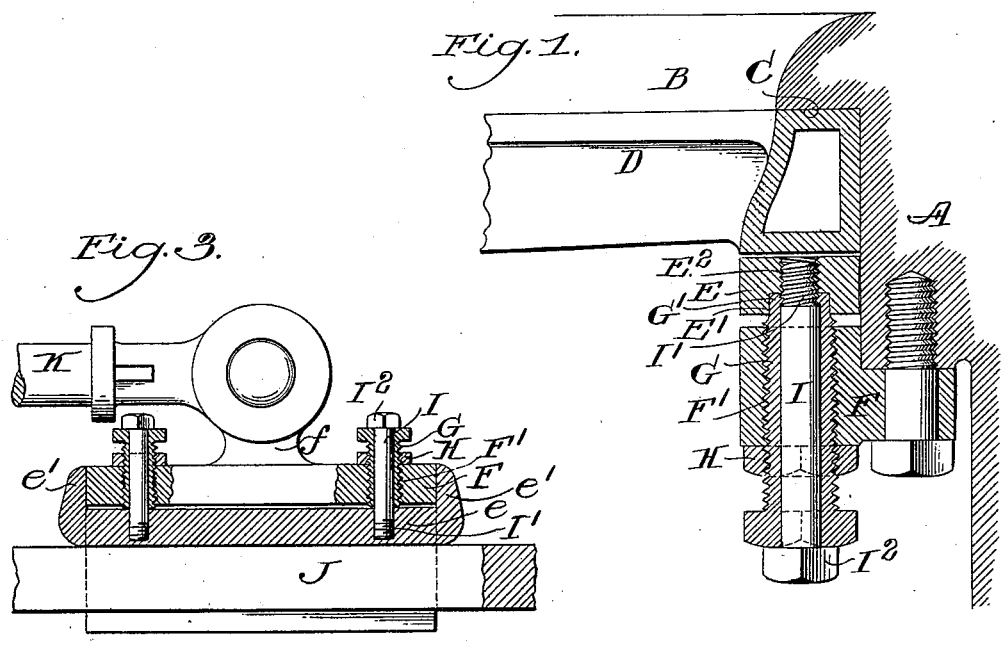
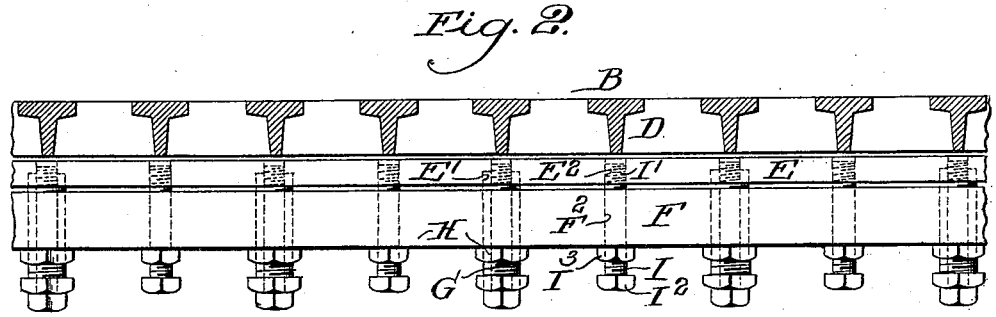
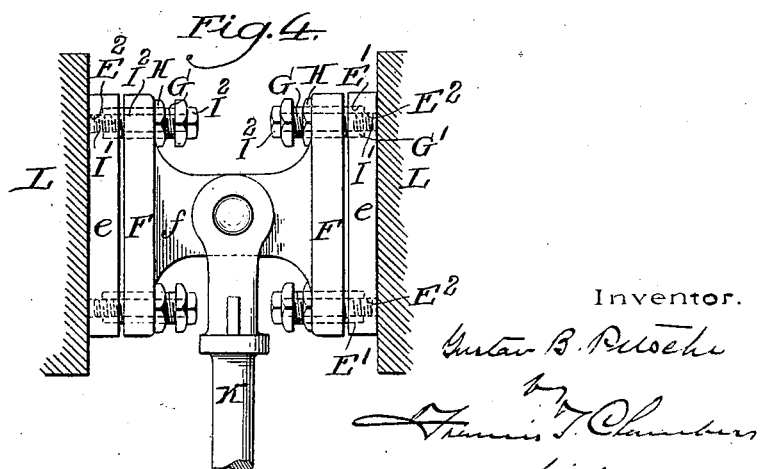
Witnesses. Inventor.
his Attorney.

UNITED STATES PATENT OFFICE.

GUSTAV BERNHARD PETSCHE, OF PHILADELPHIA, PENNSYLVANIA, ASSIGNOR TO THE SOUTHWARK FOUNDRY AND MACHINE COMPANY, OF SAME PLACE.

ADJUSTING DEVICE.

SPECIFICATION forming part of Letters Patent No. 645,211, dated March 13, 1900.

Application filed July 31, 1897. Serial No. 646,640. (No model.)

*To all whom it may concern:*

Be it known that I, GUSTAV BERNHARD PETSCHE, a subject of the Emperor of Germany, residing in the city and county of Philadelphia, in the State of Pennsylvania, have invented a certain new and useful Improvement in Adjusting Devices, of which the following is a true and exact description, reference being had to the accompanying drawings, which form a part thereof.

My invention relates to the construction of mechanism for adjusting parts of machinery, particularly guides and bearings, where nice and firm adjustments are necessary. Generally speaking, my invention consists in combining with the guide or other device to be adjusted a series of screws serving as abutments to the guide and against which it rests, either being attached to them, and another series of screws screwing into the guide and acting to draw it against the abutment-screws. Preferably I provide the guide with a series of cavities, into which the ends of the abutment-screws fit, so as to properly aline the guide; but this alinement may be secured in other ways. Preferably, also, I make the abutment-screws hollow and pass the holding-screws through the tubular abutment-screws, thus insuring that the pull shall be in direct line with the abutment-screw.

Reference being now had to the drawings in which my invention is illustrated, Figure 1 is a sectional view showing the application of my invention to the adjustment of a back bearing of a slide-valve, Fig. 2 being a longitudinal view of the same device, and Figs. 3 and 4 illustrating the application of my invention to the adjustment of cross-head guides of usual type.

A, Fig. 1, indicates the cast framing of the machine, having formed in it ports, as indicated at B, C being the face bearing of the valve, which is indicated at D.

E is the back bearing of the valve, which, as shown in Figs. 1 and 2, is formed with a series of countersunk bearings E' and a series of threaded holes $E^2$, which, as appears by Fig. 2, are partly concentric with and forming an extension of the countersunk bearings E' and partly situated between such bearings.

F is an abutment which, as shown in Figs. 1 and 2, is bolted onto the frame of the machine, but which of course may be formed integral with it. This abutment is formed with threaded perforations F', in which screws the tubular abutment-screw G, having a blunt end G', which fits into the countersunk bearing E', and a binding-nut H, by which it can be firmly secured in any desired position.

I are the holding-screws, adapted, as shown, to screw into the threaded holes $E^2$ of the bearing and also, as shown in Fig. 1, to pass through the tubular abutment-screw, the head of the holding-screw resting on the head of the abutment-screw, or, as shown in Fig. 2, the holding-screw may pass through perforations in the abutment F between the abutment-screws, in which case a binding-nut, as $I^3$, may be used with advantage.

As shown in Figs. 3 and 4, the devices to be adjusted are the bearing-surfaces (indicated at e) of the cross-heads J in Fig. 3, and L L in Fig. 4 indicating the cross-head guides. The abutments F in these figures form a part of the cross-heads and are connected by portions f with a rod (indicated at K) by which the cross-head is moved.

In Fig. 3 instead of forming countersunk openings, as $E^2$, the abutment-screws G bear directly upon the back face-guide e, extensions e' of such guide, fitting against the ends of the abutment-piece F, serving to aline the parts.

In operation when I desire to adjust the bearing or guide the pull of the bolts I is relaxed and the abutment-bolts G are all screwed down until the bearing or guide comes into even contact with the part in connection with which it is to work. I then turn each abutment-screw backward, so as to relax the pressure against the guide or bearing and to bring the ends of each abutment-screw to exactly the same distance from such guide or bearing, which of course is accomplished by simply turning each abutment-screw through the same angle. Then after locking each abutment-screw in the determined position I draw the guide or bearing up against it by the screw, and thus by a simple and easy operation secure a perfectly-even adjustment of the guide or bearing.

I am aware that in the patent to Corliss, No. 406,091, of July 2, 1889, a cross-head is shown having inclined bearing-faces upon which wedge-shaped gibs are longitudinally adjustable, the longitudinal adjustment effecting also a lateral adjustment of the gibs, and in said patent the longitudinal adjustment and anchoring of the gibs is effected by a device consisting of abutment and drawing bolts and similar in character to the device used by me. I am also aware that in the patent to Stanwood, No. 318,216, of May 19, 1885, cross-head gibs or "slippers," as the patentee calls them, are made laterally adjustable by means of longitudinally-movable wedges situated between the cross-head and its slippers, the patentee employing binding-bolts to grip and hold the slippers against the wedges. My device is, however, to be distinguished from the prior devices above mentioned in that I employ no wedge of any kind to secure the guide or gib to the flange or other device upon which it is supported, but rely solely on the abutment and binding bolts, and I am thereby enabled to adjust the guides or gibs angularly as well as laterally, while obviously an angular adjustment is impracticable in the older devices.

Having now described my invention, what I claim as new, and desire to secure by Letters Patent, is—

1. The device for adjusting the bearing-faces of relatively-reciprocating devices, such as cross-heads and their bearings, which consists of a supporting-lug, as F, having threaded bolt-holes formed therein in combination with a guide or bearing-strip, as E, lying opposite to the bolt-holes in lugs F and adjustable, both angularly and to and fro, with regard to said lug, said strip having threaded bolt-holes formed in it, abutment-bolts screwing into the holes in the lug F and bearing against the back of the strip E and another set of bolts, as I, screwing into the threaded holes in the back of strip E, and arranged, as described, to draw it against the abutment-bolts.

2. The device for adjusting the bearing-faces of relatively-reciprocating devices, such as cross-heads and their bearings, which consists of a supporting-lug, as F, having threaded bolt-holes formed therein, in combination with a guide or bearing-strip, as E, lying opposite to the bolt-holes in the lug F and adjustable, both angularly and to and fro, with regard to said lug, said strip having threaded bolt-holes formed in it and one or more unthreaded cavities, as E', also formed in its back, abutment-bolts screwing into the holes in the lug F and bearing against the back of the strip E and another set of bolts, as I, screwing into the threaded holes in the back of strip E and arranged as described to draw it against the abutment-bolts, one or more of said bolts fitting into a cavity or cavities E'.

3. The device for adjusting the bearing-faces of relatively-reciprocating devices, such as cross-heads, which consists of a supporting-lug, as F, having threaded bolt-holes formed therein, in combination with a guide or bearing-strip, as E, lying opposite to the bolt-holes in the lug F and adjustable, both angularly and to and fro, with regard to said lug, said strip having threaded bolt-holes formed in it, tubular abutment-bolts screwing into the holes in the lug F and bearing against the back of the strip E around the threaded perforations formed therein, and another set of bolts, as I, passing through the tubular bolts screwing into the threaded holes in the back of strip E and arranged as described to draw it against the abutment-bolts.

GUSTAV BERNHARD PETSCHE.

Witnesses:
CHAS. F. MYERS,
D. STEWART.